US008893091B2

(12) United States Patent
Goel (10) Patent No.: US 8,893,091 B2
(45) Date of Patent: Nov. 18, 2014

(54) RUNNING AN EXECUTABLE DURING A DEBUG SESSION

(75) Inventor: Prateek Goel, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 13/173,579

(22) Filed: Jun. 30, 2011

(65) Prior Publication Data
US 2013/0007719 A1     Jan. 3, 2013

(51) Int. Cl.
| G06F 11/30 | (2006.01) |
| G06F 7/00 | (2006.01) |
| G06F 17/00 | (2006.01) |
| G06F 15/173 | (2006.01) |
| G06F 1/24 | (2006.01) |
| G06F 11/00 | (2006.01) |
| G06F 9/44 | (2006.01) |
| G06F 11/36 | (2006.01) |

(52) U.S. Cl.
CPC ................... *G06F 11/3636* (2013.01)
USPC ........... 717/128; 702/186; 707/700; 709/224; 713/100; 714/25; 714/31; 714/48; 717/124; 717/129; 717/130

(58) Field of Classification Search
CPC ............ G06F 9/44505; G06F 17/2264; G06F 11/079; G06F 11/366; G06F 11/3636; G06F 11/3644; G06F 11/3664
See application file for complete search history.

(56) References Cited

U.S. PATENT DOCUMENTS

| 5,594,904 | A | * | 1/1997 | Linnermark et al. | ......... 717/124 |
| 5,857,102 | A | * | 1/1999 | McChesney et al. | ......... 713/100 |
| 5,933,639 | A | * | 8/1999 | Meier et al. | .................... 717/129 |
| 6,263,456 | B1 | * | 7/2001 | Boxall et al. | ..................... 714/25 |
| 6,314,530 | B1 | | 11/2001 | Mann | |
| 6,470,388 | B1 | * | 10/2002 | Niemi et al. | ................... 709/224 |
| 7,080,283 | B1 | * | 7/2006 | Songer et al. | .................... 714/31 |
| 7,770,073 | B2 | | 8/2010 | Fashchik et al. | |
| 7,882,399 | B2 | | 2/2011 | Day et al. | |
| 8,201,149 | B1 | * | 6/2012 | Gumtow et al. | ............... 717/124 |
| 8,402,170 | B2 | * | 3/2013 | Harris | ............................ 717/124 |
| 2004/0267502 | A1 | * | 12/2004 | Aliphas | ......................... 702/186 |
| 2007/0006168 | A1 | * | 1/2007 | Dimpsey et al. | .............. 717/130 |
| 2009/0013312 | A1 | | 1/2009 | Albert et al. | |

(Continued)

OTHER PUBLICATIONS

Valsmith, "Covert Debugging Circumventing Software Armoring Techniques," Offensive Computing, LLC, http://www.blackhat.com/presentations/bh-usa-07/quist_and_valsmith-WP.pdf., downloaded Jun. 15, 2011, pp. 1-10.

(Continued)

*Primary Examiner* — Don Wong
*Assistant Examiner* — Anibal Rivera
(74) *Attorney, Agent, or Firm* — Holland & Knight LLP; Brian J. Colandreo, Esq.; Jeffrey T. Placker, Esq.

(57) ABSTRACT

A method, computer program product, and system for running an executable during a debug session is described. A method may comprise running, via a computing device, a daemon during a debug session, the debug session facilitated, at least in part, by a dynamic tracing tool. The method may further comprise receiving, via the daemon, one or more commands from the dynamic tracing tool. The method may additionally comprise in response to receiving the one or more commands from the dynamic tracing tool, initiating an executable.

25 Claims, 3 Drawing Sheets

(56) References Cited

U.S. PATENT DOCUMENTS

2010/0106926 A1   4/2010  Kandasamy et al.
2011/0295821 A1*  12/2011 Harris ........................... 707/700
2012/0137181 A1*  5/2012  Thompson ...................... 714/48

OTHER PUBLICATIONS

Elms, "Debugging Optimised Code Using Function Interpretation," Programming Languages and Systems Group, Department of Computer Science, http://cutebugs.netfiles/debugging/elms97debugging.pdf., downloaded Jun. 15, 2011, pp. 1-10.

Schultz, Windows Script Host Tutorial: Debugging and Testing Your Scripts, May 8, 2001, http://www.techrepublic.com/article/windows-script-host-tutorial-debugging-and-testing-your-scripts/1052584, downloaded Apr. 1, 2011, pp. 1-9.

Howe, "Integrating Failure Recovery with Planner Debugging," Comuter Science Department, Colorado State University, http://www.aaai.org/Papers/Symposia/Spring/1994/SS-94-04/SS94-04-015.pdf. pp. 70-73.

* cited by examiner

RUNNING AN EXECUTABLE DURING A DEBUG SESSION

BACKGROUND OF THE INVENTION

Developers may need to debug applications. In order to debug applications, developers may trace applications using a dynamic tracing tool during a debug session. This may allow the developer to probe various applications in languages such as C, C++, and/or Java. The dynamic tracing tool may allow the developer to access the arguments of functions in the applications and to take various actions when the probe, or trace point, is reached.

BRIEF SUMMARY OF THE INVENTION

In an embodiment, a method may include running, via a computing device, a daemon during a debug session. The debug session may be facilitated, at least in part, by a dynamic tracing tool. The method may further include receiving, via the daemon, one or more commands from the dynamic tracing tool. The method may also include, in response to receiving the one or more commands from the dynamic tracing tool, initiating an executable.

One or more of the following features may be included. The method may further include monitoring, via the daemon, a socket. The socket may be configured to exchange data between at least two processes. The socket may be monitored to detect the one or more commands from the dynamic tracing tool. The method may also include, in response to reaching a trace point in the debug session, initiating an action required by the dynamic tracing tool. The action may be associated with, at least in part, the one or more commands. Further, the method may include passing one or more arguments from the debug session to the executable. Additionally, the method may include storing at least one of an output and an error message that may be generated by the executable in a user defined file.

In an implementation, the method may include, in response to initiating the executable, storing, via the daemon, a unique ID associated with the debug session and the executable. The method may further include, in response to determining that the debug session is over, terminating the executable. The method may also include, in response to determining that the debug session is a last debug session of a system, terminating the daemon. The method may additionally include, in response to determining that the debug session started, initiating the daemon.

In an, a computer program product may reside on a computer readable storage medium and may have a plurality of instructions stored on it. When executed by a processor, the instructions may cause the processor to perform operations including running a daemon during a debug session. The debug session may be facilitated, at least in part, by a dynamic tracing tool. The operations may further include receiving, via the daemon, one or more commands from the dynamic tracing tool. The operations may also include, in response to receiving the one or more commands from the dynamic tracing tool, initiating an executable.

One or more of the following features may be included. The operations may further include monitoring, via the daemon, a socket. The socket may be configured to exchange data between at least two processes. The socket may be monitored to detect the one or more commands from the dynamic tracing tool. The operations may also include, in response to reaching a trace point in the debug session, initiating an action required by the dynamic tracing tool. The action may be associated with, at least in part, the one or more commands. Further, the operations may include passing one or more arguments from the debug session to the executable. Additionally, the operations may include storing at least one of an output and an error message that may be generated by the executable in a user defined file.

In an implementation, the operations may include, in response to initiating the executable, storing, via the daemon, a unique ID associated with the debug session and the executable. The operations may further include, in response to determining that the debug session is over, terminating the executable. The operations may also include, in response to determining that the debug session is a last debug session of a system, terminating the daemon. The operations may additionally include, in response to determining that the debug session started, initiating the daemon.

In an embodiment, a computing system is provided. The computing system may include at least one processor and at least one memory architecture coupled with the at least one processor. The computing system may also include a first software module executable by the at least one processor and the at least one memory architecture, wherein the first software module may be configured to run a daemon during a debug session, the debug session facilitated, at least in part, by a dynamic tracing tool. Further, the computing system may include a second software module which may be configured to receive, via the daemon, one or more commands from the dynamic tracing tool. Additionally, the computing system may include a third software module which may be configured to, in response to receiving the one or more commands from the dynamic tracing tool, initiate an executable.

One or more of the following features may be included. The computing system may further include a fourth software module which may be configured to monitor, via the daemon, a socket configured to exchange data between at least two processes, to detect the one or more commands from the dynamic tracing tool. The computing system may also include a fifth software module which may be configured to, in response to reaching a trace point in the debug session, initiate an action required by the dynamic tracing tool wherein the action is associated with, at least in part, the one or more commands. The computing system may additionally include a sixth software module which may be configured to pass one or more arguments from the debug session to the executable. Further, the computing system may include a seventh software module which may be configured to store at least one of an output and an error message generated by the executable in a user defined file. Moreover, the computing system may include a eighth software module which may be configured to, in response to initiating the executable, store, via the daemon, a unique ID associated with the debug session and the executable.

In an embodiment, a method may include, in response to determining that a debug session started, initiating, via a computing device, a daemon. The method may further include running, via the computing device, the daemon during the debug session, the debug session facilitated, at least in part, by a dynamic tracing tool. The daemon may be configured to monitor a socket to detect the one or more commands from the dynamic tracing tool. The daemon may further be configured to receive the one or more commands from the dynamic tracing tool. The daemon may additionally be configured to pass one or more arguments from the debug session to an executable. The method may further include, in response to receiving, via the daemon, the one or more commands from the dynamic tracing tool, initiating, via the computing device, an executable. The method may also include passing, via the daemon, the one or more arguments from the debug session to the executable. The method may additionally include storing, via the computing device, at least one of an output and an error message generated by the executable in a user defined file. Moreover, the method may include, in response to determining that the debug session is a last debug session of a system, terminating, via the computing device, the daemon.

The details of one or more implementations are set forth in the accompanying drawings and the description below. Other features and advantages will become apparent from the description, the drawings, and the claims.

DETAILED DESCRIPTION OF THE INVENTION

Figure 1:
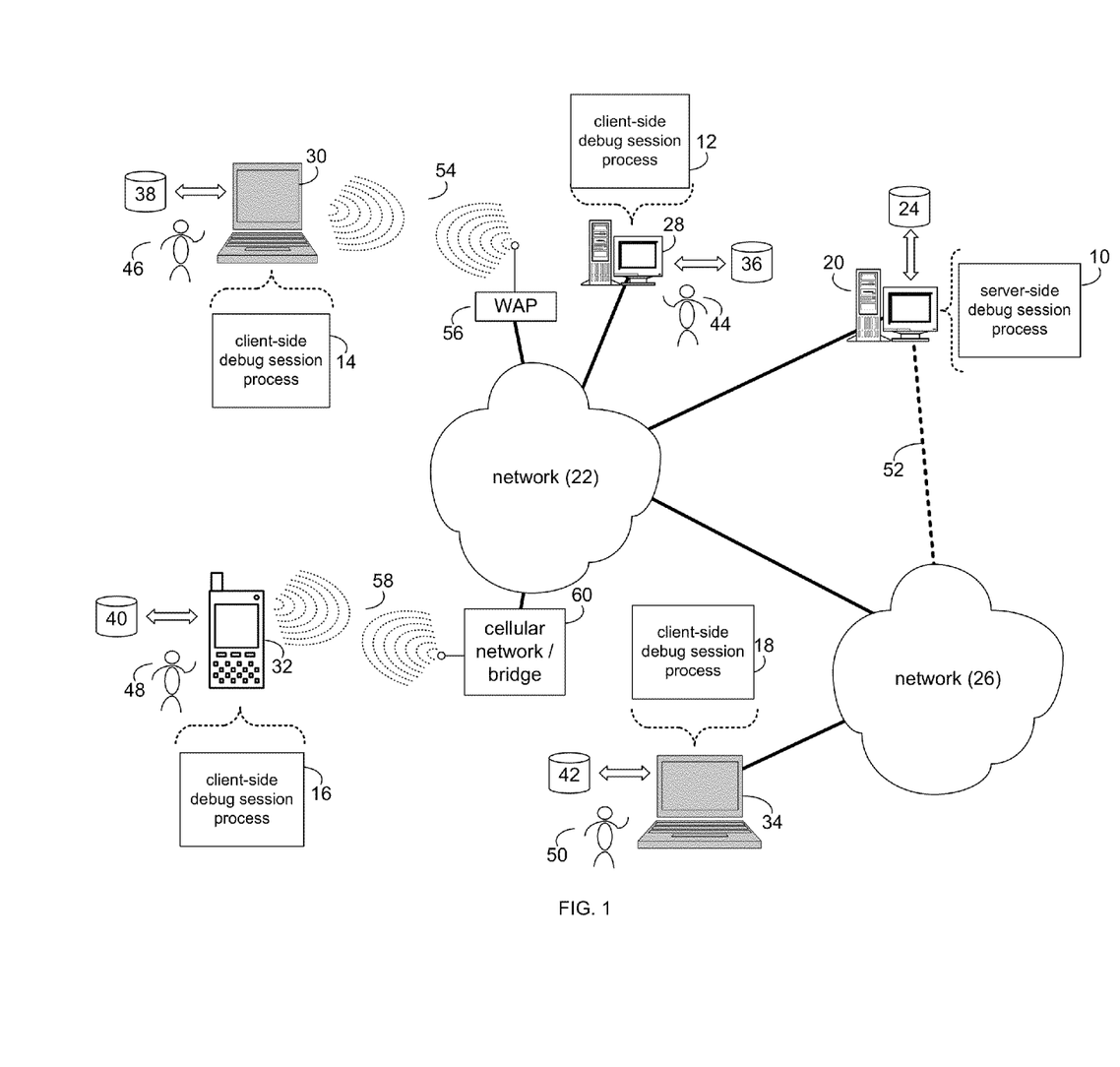
FIG. 1 is a diagrammatic view of a debug session process coupled to a distributed computing network.
Figure 2:
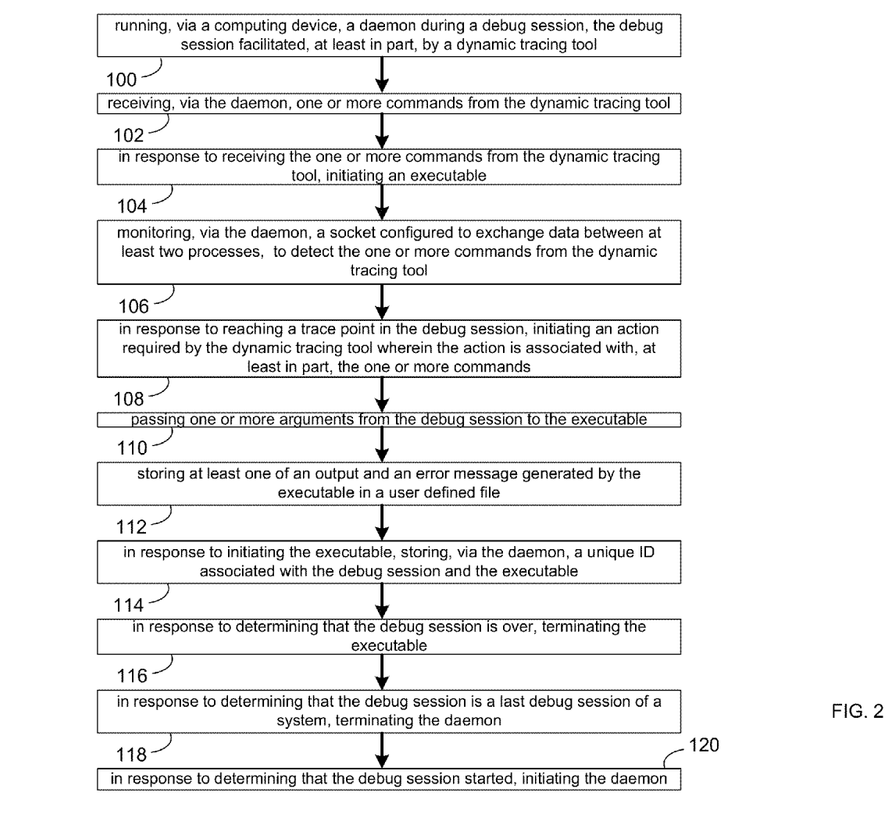
FIG. 2 is a flowchart of the debug process of FIG. 1.

Referring to FIGS. 1 & 2, there is shown a debug session process 10. As will be discussed below, debug session process 10 may run 100, a daemon during a debug session, the debug session facilitated, at least in part, by a dynamic tracing tool. Debug session process 10 may also receive 102, via the daemon, one or more commands from the dynamic tracing tool. Debug session process 10 may also, in response to receiving the one or more commands from the dynamic tracing tool, initiate 104 an executable.

The debug session (DS) process may be a server-side process (e.g., server-side DS process 10), a client-side process (e.g., client-side DS process 12, client-side DS process 14, client-side DS process 16, or client-side DS process 18), or a hybrid server-side/client-side process (e.g., the combination of server-side DS process 10 and one or more of client-side DS processes 12, 14, 16, 18).

Server-side DS process 10 may reside on and may be executed by server computer 20, which may be connected to network 22 (e.g., the Internet or a local area network). Examples of server computer 20 may include, but are not limited to: a personal computer, a server computer, a series of server computers, a mini computer, and/or a mainframe computer. Server computer 20 may be a web server (or a series of servers) running a network operating system, examples of which may include but are not limited to: Microsoft Windows Server; Novell Netware; or Red Hat Linux, for example.

The instruction sets and subroutines of server-side DS process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a RAID array; a random access memory (RAM); and a read-only memory (ROM).

Server computer 20 may execute a web server application, examples of which may include but are not limited to: Microsoft IIS, Novell Web Server, or Apache Web Server, that allows for access to server computer 20 (via network 22) using one or more protocols, examples of which may include but are not limited to HTTP (i.e., HyperText Transfer Protocol), SIP (i.e., session initiation protocol), and the Lotus® Sametime® VP protocol. Network 22 may be connected to one or more secondary networks (e.g., network 26), examples of which may include but are not limited to: a local area network; a wide area network; or an intranet, for example.

Client-side DS processes 12, 14, 16, 18 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 22 and/or network 26 and may each execute an operating system, examples of which may include but are not limited to Microsoft Windows, Microsoft Windows CE, Red Hat Linux, or a custom operating system.

The instruction sets and subroutines of client-side DS processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

Client-side DS processes 12, 14, 16, 18 and/or server-side DS process 10 may be processes that run within (i.e., are part of) a dynamic tracing facility and/or tool (e.g., IBM® ProbeVue), and/or an operating system (e.g., IBM® AIX®) that may include the a dynamic tracing facility and/or tool. Alternatively, client-side DS processes 12, 14, 16, 18 and/or server-side DS process 10 may be stand-alone applications that work in conjunction with the software configuration management system and/or application. One or more of client-side DS processes 12, 14, 16, 18 and server-side DS process 10 may interface with each other (via network 22 and/or network 26).

Users 44, 46, 48, 50 may access server-side DS process 10 directly through the device on which the client-side DS process (e.g., client-side DS processes 12, 14, 16, 18) is executed, namely client electronic devices 28, 30, 32, 34, for example. Users 44, 46, 48, 50 may access server-side DS process 10 directly through network 22 and/or through secondary network 26. Further, server computer 20 (i.e., the computer that executes server-side DS process 10) may be connected to network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, 802.11n, Wi-Fi, and/or Bluetooth device that is capable of establishing wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

The Debug Session (DS) Process

For the following discussion, server-side DS process 10 will be described for illustrative purposes. It should be noted that client-side DS process 12 may be incorporated into server-side DS process 10 and may be executed within one or more applications that allow for communication with client-side DS process 12. However, this is not intended to be a limitation of this disclosure, as other configurations are possible (e.g., stand-alone, client-side DS processes and/or stand-alone server-side DS processes.) For example, some implementations may include one or more of client-side DS processes 12, 14, 16, 18 in place of or in addition to server-side DS process 10.

Developers may collect data while tracing an application by using a dynamic trace facility and/or tool, such as IBM® ProbeVue. A dynamic tracing tool may allow a developer to dynamically trace applications in, for example C, C++, and/or Java, and/or system calls, in the system. If a developer needs to take an action during the debug session such as, for example, deleting a file when another particular file is created, the developer may write a shell script to perform such an action. However, shell scripts may run in a "while" loop and may use valuable processing resources. As will be discussed below, the user may run a executable from a debug session associated with a dynamic tracing tool in order to perform such an action. This may save valuable processor resources would be used in a "while" loop, and may allow the developer to trace other aspects of the application as well.

Figure 3:
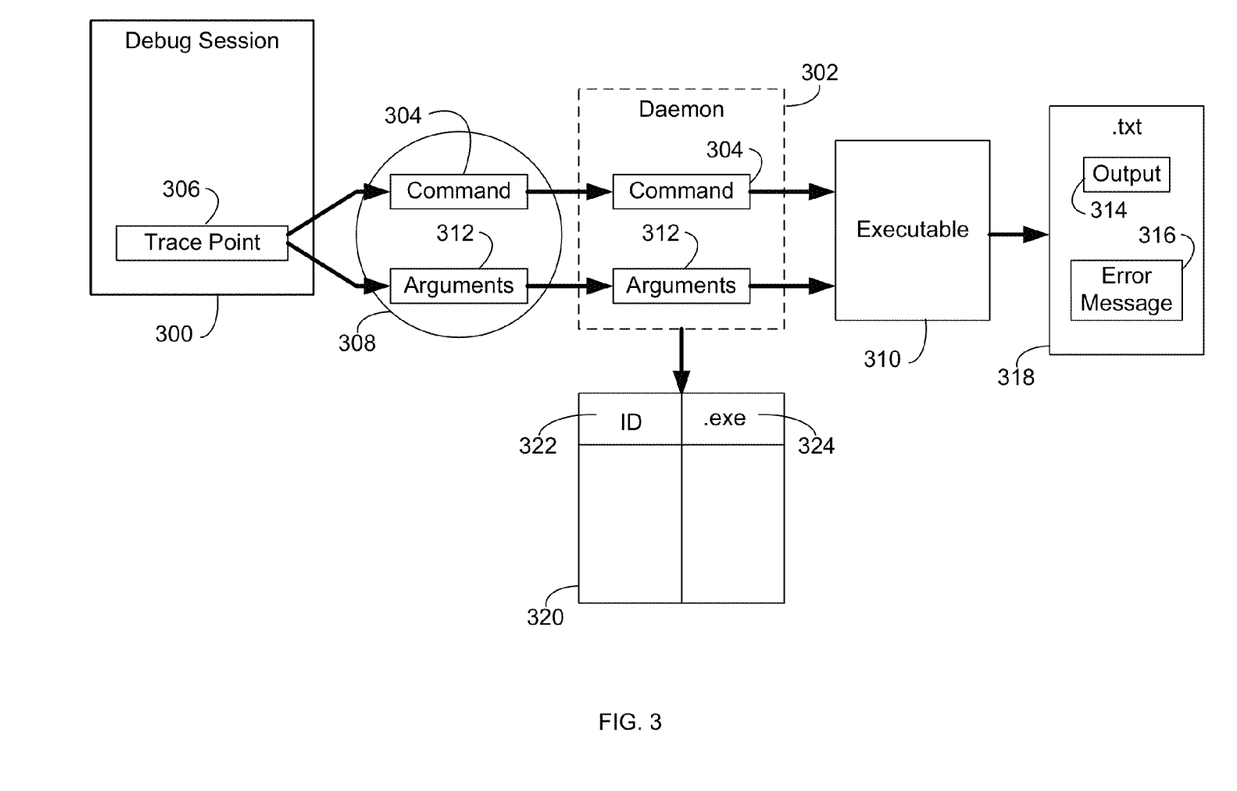
FIG. 3 is a diagrammatic flow chart which may be associated with the debug session process of FIG. 1.

Referring now to FIGS. 1-3, DS process 10 may run 100 a daemon (e.g., daemon 302) during a debug session (e.g., debug session 300). The debug session (e.g., debug session 300) may be facilitated, at least in part, by a dynamic tracing tool. As discussed above, the dynamic tracing tool may be, for example, a tool such as IBM® ProbeVue which may be offered from an operating system (e.g., IBM® AIX®). The dynamic tracing tool may allow a developer to dynamically trace applications in, for example C, C++, and/or Java in order to debug the applications. A daemon (e.g., daemon 302) may be a program that runs in the background of an operating system. In other words, daemon 300 may not be controlled by a user and may be initiated by a background process or, for example, DS process 10.

Further, DS process 10 may receive 102, via the daemon (e.g., daemon 302), one or more commands (e.g., command 304) from the dynamic tracing tool. The dynamic tracing tool may allow a developer to place a trace point (e.g., trace point 306) in the debug session. When the trace point (e.g., trace point 306) is reached during the debug session, an action required by the trace point may be taken by the dynamic tracing tool. The action may include, for example, one or more commands such as command 304. The daemon (e.g., daemon 302) may communicate with the dynamic trace tool and/or the debug session (e.g., debug session 300) over a socket (e.g., socket 308). Socket 308 may be configured to allow for inter-process communication. Socket 308 may be a point for exchanging data between two or more processes running in the same operating system (e.g., IBM® AIX®).

For example, a socket (e.g., socket 308) may allow for debug session 300 (or the dynamic tracing tool) and daemon 302 to communicate and/or exchange information. DS process 10 may monitor 106, via daemon 302, socket 308 which may be configured to exchange data between at least two processes (e.g., debug session 300 and/or daemon 302), to detect the one or more commands (e.g., command 304) from the dynamic tracing tool.

In response to receiving the one or more commands (e.g., command 304) from the dynamic tracing tool, DS process 10 may initiate 104 an executable (e.g., executable 310). An executable (e.g., executable 310) may be a file configured to cause a processor to perform one or more operations in accordance with one or more instructions in the executable file. As discussed above, if a developer needs to take an action during the debug session (e.g., debug session 300) such as, for example, deleting a file when another particular file is created, the developer run an executable (e.g., executable 310) from a debug session (e.g., debug session 300) associated with the dynamic tracing tool in order to perform such an action. Other actions that the developer may wish to have performed by an executable (e.g., executable 310) may include, but are not limited to, running a cleanup on a database showing garbage values, resetting one or more values, and/or changing one or more values. Command 304 may cause daemon 302 to run a specific executable with specific arguments. Executable 310 may be developed and/or configured by the developer in connection with the application being debugged. As the developer may have many executables available to run for various purposes during debug session 300, command 304 may guide daemon 302 as to which executable to run, and with which arguments to use as inputs.

Further, in response to receiving the one or more commands (e.g., command 304) from the dynamic tracing tool, DS process 10 may initiate 108 an action required by the dynamic tracing tool. The action may be associated with, at least in part, the one or more commands (e.g., command 304). The action may be, for example, a command to initiate a certain executable with a certain argument. DS process 10 may also pass 110 one or more arguments (e.g., arguments 312) from the debug session (e.g., debug session 300) to the executable (e.g., executable 310). Arguments 312 may be passed 110 to executable 310 via daemon 302 and/or socket 308. For example, arguments 312 may be values taken from the debug session (e.g., debug session 300) and may be passed to the executable (e.g., executable 310).

DS process 10 may also store 112 at least one of an output (e.g., output 314) and an error message (e.g., error message 316) generated by the executable (e.g., executable 310) in a user defined file (e.g., file 318). File 318 may be a text file and/or may be designated by a developer before the debug session (e.g., debug session 300) is run. Further, in response to initiating the executable (e.g., executable 310), DS process 10 may store 114, via the daemon (e.g., daemon 302), a unique ID (e.g., as shown by ID column 322 in table 320) associated with the debug session (e.g., debug session 300) and the executable (e.g., executable 310) that was initiated. DS process 10 may store 114 the unique ID associated with the debug session (e.g., debug session 300) in, for example, column 322 of table 320. Further, the executable (e.g., executable 310) that was initiated may be stored in, for example, column 324 of table 320. While not shown, table 320 may also store one more arguments (e.g., arguments 312) passed from the debug session (e.g., debug session 300) to the executable (e.g., executable 310). The developer may refer to table 320 during or after debug session 300 in order to investigate the operation of the application being debugged.

Additionally, DS process 10 may manage the running of the executable (e.g., executable 310) and/or the daemon (e.g., daemon 302). In this way, DS process 10 may ensure that extra resources such as processing capacity and/or memory are not being used by running executable 310 and/or daemon 302 while there is no debug session running. For example, in response to determining that the debug session is over, DS process 10 may terminate 116 (i.e., stop the executable) the executable from running. Further, in response to determining that the debug session (e.g., debug session 300) is a last debug session of a system, DS process 10 may terminate 118 the daemon (e.g., daemon 302). Similarly, DS process 10 may ensure that daemon 302 is running while there is a debug session (e.g., debug session 300) running. In other words, the first debug session may be responsible for initiating the daemon, and the last debug session may be responsible for shutting down the daemon. As such, in response to determining that the debug session (e.g., debug session 300) started, DS process 10 may initiate 120 the daemon (e.g., daemon 302).

Since executable 310 and daemon 302 run as two separate processes, they are configured not to interfere with each other even though they may run in the same operating system. While this disclosure discusses primarily executable 310, this should not be construed as a limitation of the present disclosure as more than one, or many, executables may run at the same time during a debug session (e.g., debug session 300). Foe example, once executable 310 is initiated in response to one or more commands from the dynamic tracing tool, daemon 302 may continue to monitor socket 308 for one or more commands as debug session 300 continues to run in order to determine if, and when, other executables should be initiated.

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (i.e., a client electronic device), partly on the user's computer, as a stand-alone software package, partly on the user's computer and partly on a remote computer or entirely on the remote computer or server (i.e., a server computer). In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures may illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Further, one or more blocks shown in the block diagrams and/or flowchart illustration may not be performed in some implementations or may not be required in some implementations. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A number of embodiments and implementations have been described. Nevertheless, it will be understood that various modifications may be made. Accordingly, other embodiments and implementations are within the scope of the following claims.

What is claimed is:

1. A method comprising:
    running, via a computing device, a daemon in the background during a debug session, the debug session facilitated, at least in part, by a dynamic tracing tool;
    receiving, via the daemon, one or more commands from the dynamic tracing tool; and
    in response to receiving the one or more commands from the dynamic tracing tool, selecting and initiating an executable of a plurality of executables, wherein the one or more commands guide the daemon to select the executable of the plurality of executables to initiate and initiate the executable with at least one of one or more arguments passed from the debug session;
    wherein the daemon is a separate process from the debug session and wherein the daemon continues to monitor a communication socket as the debug session continues to run.

2. The method of claim 1, further comprising:
    monitoring, via the daemon, a socket configured to exchange data between at least two processes, to detect the one or more commands from the dynamic tracing tool.

3. The method of claim 1, further comprising:
    in response to reaching a trace point in the debug session, initiating an action required by the dynamic tracing tool wherein the action is associated with, at least in part, the one or more commands.

4. The method of claim 1, further comprising:
    passing the one or more arguments from the debug session to the executable.

5. The method of claim 1, further comprising:
    storing at least one of an output and an error message generated by the executable in a user defined file.

6. The method of claim 1, further comprising:
    in response to initiating the executable, storing, via the daemon, a unique ID associated with the debug session and the executable.

7. The method of claim 1, further comprising:
    in response to determining that the debug session is over, terminating the executable.

8. The method of claim 1, further comprising:
    in response to determining that the debug session is a last debug session of a system, terminating the daemon.

9. The method of claim 1, further comprising:
    in response to determining that the debug session started, initiating the daemon.

10. A computer program product residing on a non-transitory computer readable storage medium having a plurality of instructions stored thereon, which, when executed by a processor, cause the processor to perform operations comprising:
    running a daemon in the background during a debug session, the debug session facilitated, at least in part, by a dynamic tracing tool;
    receiving, via the daemon, one or more commands from the dynamic tracing tool; and
    in response to receiving the one or more commands from the dynamic tracing tool, selecting and initiating an executable of a plurality of executables, wherein the one or more commands guide the daemon to select the executable of the plurality of executables to initiate and initiate the executable with at least one of one or more arguments passed from the debug session;
    wherein the daemon is a separate process from the debug session and wherein the daemon continues to monitor a communication socket as the debug session continues to run.

11. The computer program product of claim 10, further comprising:
    monitoring, via the daemon, a socket configured to exchange data between at least two processes, to detect the one or more commands from the dynamic tracing tool.

12. The computer program product of claim 10, further comprising:
    in response to reaching a trace point in the debug session, initiating an action required by the dynamic tracing tool wherein the action is associated with, at least in part, the one or more commands.

13. The computer program product of claim 10, further comprising:
    passing the one or more arguments from the debug session to the executable.

14. The computer program product of claim 10, further comprising:
    storing at least one of an output and an error message generated by the executable in a user defined file.

15. The computer program product of claim 10, further comprising:
    in response to initiating the executable, storing, via the daemon, a unique ID associated with the debug session and the executable.

16. The computer program product of claim 10, further comprising:
    in response to determining that the debug session is over, terminating the executable.

17. The computer program product of claim 10, further comprising:
    in response to determining that the debug session is a last debug session of a system, terminating the daemon.

18. The computer program product of claim 10, further comprising:
    in response to determining that the debug session started, initiating the daemon.

19. A computing system comprising:
    at least one processor;
    at least one memory architecture coupled with the at least one processor;
    a first software module executable by the at least one processor and the at least one memory architecture, wherein the first software module is configured to run a daemon in the background during a debug session, the debug session facilitated, at least in part, by a dynamic tracing tool;

a second software module executable by the at least one processor and the at least one memory architecture, wherein the second software module is configured to receive, via the daemon, one or more commands from the dynamic tracing tool; and a third software module executable by the at least one processor and the at least one memory architecture, wherein the third software module is configured to, in response to receiving the one or more commands from the dynamic tracing tool, select and initiate an executable of a plurality of executables, wherein the one or more commands guide the daemon to select the executable of the plurality of executables to initiate and initiate the executable with at least one of one or more arguments passed from the debug session;

wherein the daemon is a separate process from the debug session and wherein the daemon continues to monitor a communication socket as the debug session continues to run.

20. The computing system of claim 19, further comprising:
a fourth software module executable by the at least one processor and the at least one memory architecture, wherein the fourth software module is configured to monitor, via the daemon, a socket configured to exchange data between at least two processes, to detect the one or more commands from the dynamic tracing tool.

21. The computing system of claim 19, further comprising:
a fifth software module executable by the at least one processor and the at least one memory architecture, wherein the fifth software module is configured to, in response to reaching a trace point in the debug session, initiate an action required by the dynamic tracing tool wherein the action is associated with, at least in part, the one or more commands.

22. The computing system of claim 19, further comprising:
a sixth software module executable by the at least one processor and the at least one memory architecture, wherein the sixth software module is configured to pass the one or more arguments from the debug session to the executable.

23. The computing system of claim 19, further comprising:
a seventh software module executable by the at least one processor and the at least one memory architecture, wherein the seventh software module is configured to store at least one of an output and an error message generated by the executable in a user defined file.

24. The computing system of claim 19, further comprising:
an eight software module executable by the at least one processor and the at least one memory architecture, wherein the eight software module is configured to, in response to initiating the executable, store, via the daemon, a unique ID associated with the debug session and the executable.

25. A method comprising:
in response to determining that a debug session started, initiating, via a computing device, a daemon;
running, via the computing device, the daemon in the background during the debug session, the debug session facilitated, at least in part, by a dynamic tracing tool, the daemon configured to:
 monitor a socket to detect one or more commands from the dynamic tracing tool; and
 receive the one or more commands from the dynamic tracing tool;
in response to receiving, via the daemon, the one or more commands from the dynamic tracing tool, selecting and initiating, via the computing device, an executable of a plurality of executables, wherein the one or more commands guide the daemon to select the executable of the plurality of executables to initiate;
passing, via the daemon, one or more arguments from the debug session to the executable, wherein the one or more commands initiate the executable with at least one of the one or more arguments passed from the debug session;
storing, via the computing device, at least one of an output and an error message generated by the executable in a user defined file; and
in response to determining that the debug session is a last debug session of a system, terminating, via the computing device, the daemon;
wherein the daemon is a separate process from the debug session and wherein the daemon continues to monitor a communication socket as the debug session continues to run.

* * * * *